United States Patent
Wang et al.

(10) Patent No.: US 9,376,587 B2
(45) Date of Patent: Jun. 28, 2016

(54) PIGMENT DISPERSION AND METHOD FOR PREPARING SAME

(71) Applicant: BOE TECHNOLOGY GROUP CO., LTD., Beijing (CN)

(72) Inventors: Xuelan Wang, Beijing (CN); Chen Liu, Beijing (CN); Jisheng Zhao, Beijing (CN); Wenwen Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 281 days.

(21) Appl. No.: 13/980,486

(22) PCT Filed: Dec. 21, 2012

(86) PCT No.: PCT/CN2012/087111
§ 371 (c)(1),
(2) Date: Jul. 18, 2013

(87) PCT Pub. No.: WO2014/012336
PCT Pub. Date: Jan. 23, 2014

(65) Prior Publication Data
US 2014/0058017 A1    Feb. 27, 2014

(30) Foreign Application Priority Data
Jul. 19, 2012  (CN) .......................... 2012 1 0251473

(51) Int. Cl.
*C09D 153/00* (2006.01)
*C09D 5/02* (2006.01)
*C09D 17/00* (2006.01)
(Continued)

(52) U.S. Cl.
CPC ............ *C09D 153/00* (2013.01); *C08G 65/337* (2013.01); *C09B 67/009* (2013.01); *C09B 67/0023* (2013.01); *C09D 5/027* (2013.01); *C09D 17/003* (2013.01); *C09D 163/00* (2013.01)

(58) Field of Classification Search
CPC ............................. C08L 63/00; C09D 153/00
USPC ........................................................ 523/454
See application file for complete search history.

(56) References Cited

U.S. PATENT DOCUMENTS 7,994,271 B2 * 8/2011 Murata et al. .................. 528/153
2002/0055058 A1 * 5/2002 Sorori et al. ............... 430/270.1
(Continued)

FOREIGN PATENT DOCUMENTS

| CN | 101211110 A | 7/2008 |
| CN | 101379132 A | 3/2009 |

(Continued)

OTHER PUBLICATIONS

Second Chinese Office Action dated Apr. 23, 2014; Appl. No. 201210251473.X.
(Continued)

*Primary Examiner* — Megan McCulley
(74) *Attorney, Agent, or Firm* — Ladas & Parry LLP

(57) ABSTRACT

A pigment dispersion and a method for preparing the same are provided. The pigment dispersion comprises the following components in the following mass percentage: 10%~20% pigment, 1.5%~12% dispersant, 0.75%~7.5% binder resin, 58.5%~87.3% solvent and 0.45%~2% nonionic surfactant, based on the total mass of the pigment dispersion. The pigment dispersion is improved in stability, and is applicable to a colored filter.

9 Claims, 1 Drawing Sheet

(51) Int. Cl.
*C09B 67/00* (2006.01)
*C09B 67/46* (2006.01)
*C09D 163/00* (2006.01)
*C08G 65/337* (2006.01)

(56) References Cited

U.S. PATENT DOCUMENTS

| | | | |
|---|---|---|---|
| 2004/0009294 A1* | 1/2004 | Kuribayashi et al. | 427/212 |
| 2004/0102548 A1* | 5/2004 | Suzuki | 524/88 |
| 2007/0037923 A1* | 2/2007 | Shiba et al. | 524/556 |
| 2008/0026324 A1* | 1/2008 | Aoshima et al. | 430/281.1 |
| 2008/0160432 A1 | 7/2008 | Byon et al. | |
| 2009/0047431 A1* | 2/2009 | Hatada et al. | 427/256 |
| 2009/0239996 A1* | 9/2009 | Saito et al. | 524/558 |
| 2009/0246480 A1* | 10/2009 | Saito | 428/195.1 |
| 2010/0247772 A1* | 9/2010 | Saito | 427/256 |
| 2011/0228201 A1 | 9/2011 | Hsu et al. | |
| 2012/0329909 A1* | 12/2012 | Kuehn et al. | 523/401 |

FOREIGN PATENT DOCUMENTS

| | | |
|---|---|---|
| CN | 101760042 A | 6/2010 |
| CN | 102015904 A | 4/2011 |
| CN | 102453354 A | 5/2012 |
| CN | 102816477 A | 12/2012 |

OTHER PUBLICATIONS

International Search Report dated Apr. 18, 2013; PCT/CN2012/087111.

First Chinese Office Action issued Aug. 5, 2013; Appln. No. 201210251473.X.

International Preliminary Report on Patentability Appln. No. PCT/CN2012/087111.

Extended European Search Report dated Dec. 1, 2015; Appln. No. 12868328.1-1454/2876143; PCT/CN2012087111.

* cited by examiner

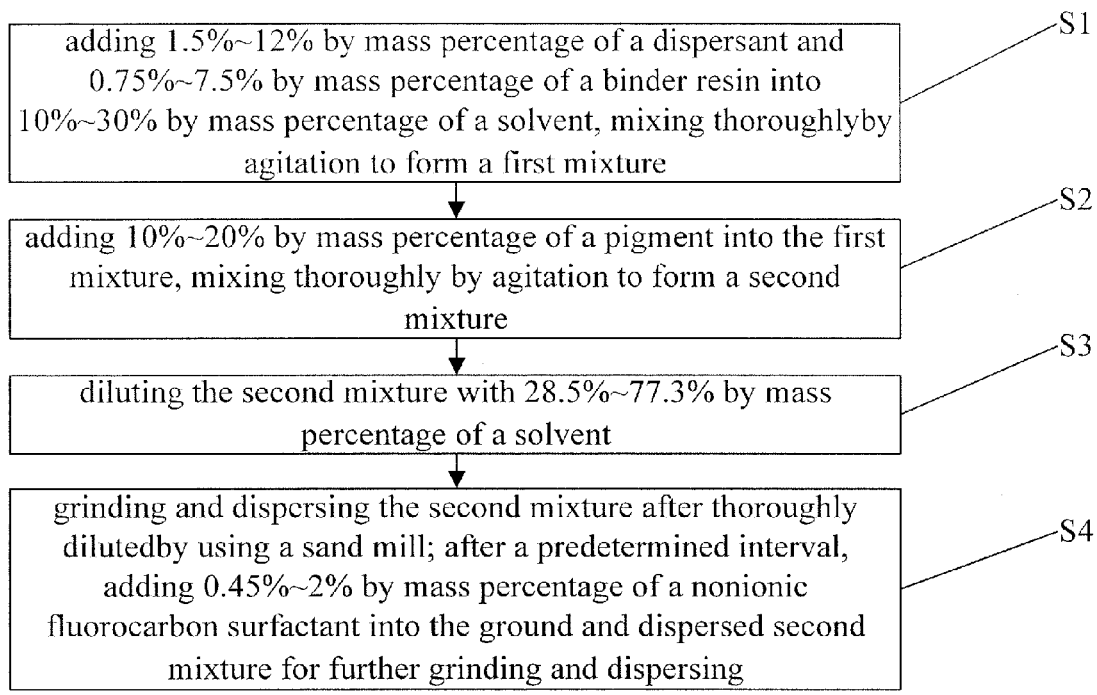

PIGMENT DISPERSION AND METHOD FOR PREPARING SAME

TECHNICAL FIELD

The invention relates to a pigment dispersion and a method for preparing the same.

BACKGROUND

A colored filter is an optical filter exhibiting a color. It can accurately select light in a small range of wave band to be passed and reflect other undesirable wavelength. The colored filter is normally installed in front of the light source so that human eyes can receive saturated light of a certain color.

Currently, there are at least 10 methods for manufacturing a colored filter, although considering economical efficiency, stability of the manufactured product, and the requirements for the function of the colored filter such as color saturation, resolution, etc., the commonly used techniques include dyeing, pigment dispersion, printing and electrodeposition, in which pigment dispersion has become the major method for preparing the colored filter due to the advantages of the colored filter thus prepared such as high color purity, high precision, micronization, etc.

The basic mechanism of pigment dispersion is to coat a pigment photoresist agent on a transparent underlying substrate, which is then illuminated with ultraviolet light or similar light, etc., so as to allow the curing of the pigment photoresist agent to a pigment photoresist. The pigment photoresist agent comprises a pigment dispersion which primarily comprises a colored pigment, a dispersant, a binder resin and a solvent. The colored pigment in the pigment dispersion can determine the color of the pigment photoresist eventually formed.

The inventor has found during the implementation of the invention that the stability of the pigment dispersion is very important. If the pigment dispersion used has poor stability, the pigment particles in the pigment dispersion is prone to deposition or even coagulation, which directly causes the unevenness of the surface and coating of the colored film of the colored filter, thereby resulting in the generation of deficiencies such as the light leak of the colored filter, etc.

SUMMARY

The technical problem to be solved by the invention is to provide a pigment dispersion and a method for preparing the same which can greatly increase the stability of the pigment dispersion.

In order to solve the aforementioned technical problem, the following technical solution is employed for the pigment dispersion of the invention:

A pigment dispersion comprising the following components in the following mass percentage: 10%~20% pigment, 1.5%~12% dispersant, 0.75%~7.5% binder resin, 58.5%~87.3% solvent and 0.45%~2% nonionic fluorocarbon surfactant, by the total mass of the pigment dispersion.

The pigment is preferably a phthalocyanine pigment.
The dispersant is preferably a block copolymer.
The binder resin is preferably an epoxy resin.
The nonionic fluorocarbon surfactant can be nonionic polyoxyethylene ether fluorocarbon surfactants, fluorocarbon surfactants containing fluoroalkyl ethoxy ether alcohol, fluorocarbon surfactants having polyoxyethylene moieties, fluorocarbon surfactants containing fluoroalkyl ether alcohol, fluorocarbon surfactants having the polyoxyethylene alcohol of perfluoroalkyl thioether, fluorocarbon surfactants having perfluorocarboxamide polyoxyethylene ether alcohol, and fluorocarbon surfactants containing fluoroalkyl sulfamido alcohol, in which the nonionic polyoxyethylene ether fluorocarbon surfactants are preferred.

The solvent is preferably propylene glycol methyl ether acetate, ethyl 3-ethoxypropionate, propylene glycol diacetate, 2-heptanone or cyclohexanone, in which PMA, EEP or propylene glycol diacetate is preferred.

In the technical solutions of the embodiments of the invention, a pigment dispersion is provided, which has a small particle size, low viscosity and good stability which increases the evenness of the surface of the colored film of the colored filter, facilitates the even distribution of the colored film on the colored filter, and effectively reducing the possibility of the deficiencies such as the light leak of the colored filter, etc.

In order to further solve the aforementioned technical problems, the method for preparing the pigment dispersion of the invention employs the following technical solution:

A method for preparing the aforementioned pigment dispersion comprising:

S1, adding 1.5%~12% by mass percentage of a dispersant and 0.75%~7.5% by mass percentage of a binder resin into 10%~30% by mass percentage of a solvent, and mixing thoroughly by agitation to form a first mixture;

S2, adding 10%~20% by mass percentage of a pigment into the first mixture, and mixing thoroughly by agitation to form a second mixture;

S3, diluting the second mixture with 28.5%~77.3% by mass percentage of a solvent; and S4, grinding and dispersing the second mixture after being thoroughly diluted by using a sand mill; after a predetermined interval, adding 0.45%~2% by mass percentage of a nonionic fluorocarbon surfactant into the ground and dispersed second mixture for further grinding and dispersing, thereby obtaining the pigment dispersion, wherein the mass percentage is based on the total mass of the pigment dispersion. Moreover, the predetermined interval can be any required time for grinding and dispersing, for example, 1-10 hours, preferably 2-8 hours.

The invention further provides another method for preparing a pigment dispersion comprising the following steps:

S1, adding 1.5%~12% by mass percentage of a dispersant, 0.75%~7.5% by mass percentage of a binder resin and 0.45%~2% by mass percentage of a nonionic fluorocarbon surfactant into 10%~30% by mass percentage of a solvent, and mixing thoroughly by agitation to form a first mixture;

S2, adding 10%~20% by mass percentage of a pigment into the first mixture, and mixing thoroughly by agitation to form a second mixture;

S3, diluting the second mixture with 28.5%~77.3% by mass percentage of a solvent; and S4, grinding and dispersing the second mixture after being thoroughly diluted by using a sand mill, thereby obtaining the pigment dispersion.

The invention further provides a method for preparing a pigment dispersion comprising the following steps:

S1, adding 1.5%~12% by mass percentage of a dispersant and 0.75%~7.5% by mass percentage of a binder resin into 10%~30% by mass percentage of a solvent, and mixing thoroughly by agitation to form a first mixture;

S2, adding 10%~20% by mass percentage of a pigment into the first mixture, and mixing thoroughly by agitation to form a second mixture;

S3, diluting the second mixture with 28.5%~77.3% by mass percentage of a solvent;

S4, grinding and dispersing the second mixture after being thoroughly diluted by using a sand mill to form a third mixture; and S5, adding 0.45%~2% by mass percentage of a nonionic fluorocarbon surfactant into the third mixture, thereby obtaining the pigment dispersion.

In the technical solutions of the embodiments of the invention, the method for preparing the aforementioned pigment dispersion is further provided. This method is improvement to the methods for preparing the pigment dispersion in the prior art, and makes the obtained pigment dispersion have small particle size, low viscosity and good stability. Moreover, this method has simple operation, low cost and is easy to popularize and use.

BRIEF DESCRIPTION OF THE DRAWINGS

In order to more clearly illustrate the technical solutions of the embodiments of the invention, the figure of the embodiments will be briefly introduced below. Apparently, the figure in the following description merely relates to a few embodiments of the invention, rather than limits the invention.

FIG. 1 is a flow chart of the method for preparing the pigment dispersion in the embodiments of the invention.

DETAILED DESCRIPTION

In order to make the object, technical solutions and advantages of the embodiments of the invention more clear, the technical solutions of the embodiments of the present invention are clearly and completely described below in relation to the figures of the embodiments of the present invention. Apparently, the embodiments described are merely some, rather than all embodiments of the present invention. Based on the embodiments of the invention described, any other embodiments obtained by a person of ordinary skill in the art without resorting to creative labor are within the scope of the present invention.

The invention provides a pigment dispersion having the advantages of small particle size, low viscosity and high storage stability, etc.

The pigment dispersion comprises the following components in the following mass percentage: 10%~20% pigment, 1.5%~12% dispersant, 0.75%~7.5% binder resin, 58.5%~87.3% solvent and 0.45%~2% nonionic surfactant, based on the total mass of the pigment dispersion.

The nonionic fluorocarbon surfactant is preferably a nonionic polyoxyethylene ether fluorocarbon surfactants; furthermore, The nonionic fluorocarbon surfactant can also be fluorocarbon surfactants containing fluoroalkyl ethoxy ether alcohol, fluorocarbon surfactants having polyoxyethylene moieties, fluorocarbon surfactants containing fluoroalkyl ether alcohol, fluorocarbon surfactants having the polyoxyethylene alcohol of perfluoroalkyl thioether, fluorocarbon surfactants having perfluorocarboxamide polyoxyethylene ether alcohol, and fluorocarbon surfactants containing fluoroalkyl sulfamido alcohol, etc. The nonionic polyoxyethylene ether fluorocarbon surfactants have the following chemical formula:

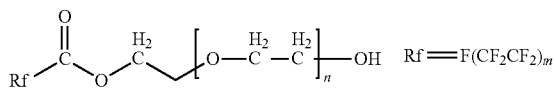

wherein m in the formula is 1~9, and n is 8~11.

This nonionic polyoxyethylene ether fluorocarbon surfactants can, for example, be purchased from Shanghai Intechem Corporation Co. Ltd. Moreover, in an embodiment of the invention, the pigment in the pigment dispersion can use phthalocyanine pigment. As to phthalocyanine pigment, phthalocyanine green G36, phthalocyanine green G58, yellowish phthalocyanine green 3G, phthalocyanine blue 15:1, phthalocyanine blue 15:3, and phthalocyanine blue 15:4 can be enumerated. In an embodiment, the phthalocyanine green pigment with the color number of G36 is employed.

The dispersant is preferably a block copolymer. As to the block copolymer, for example, a block copolymer having pigment affinity groups, for example, BYK 115, BYK161, BYK163, BYK174, BYK182, BYK185; and acrylate block copolymer, for example, BYK2000 series, etc., can be enumerated. In a preferred embodiment, acrylate block copolymers are preferably used as the dispersant in the invention. In a few embodiments, dispersants of BYK2000 series (for example, BYK2000, BYK2001, Produced by BYK, Germany) are used, with their solid content usually being 40~46%.

The binder resin is preferably an epoxy resin. As to epoxy resin, for example, phenol type phenol formaldehyde epoxy resin, o-cresol phenol formaldehyde epoxy resin, bisphenol A phenol formaldehyde epoxy resin, aldehyde epoxy resin, bisphenol F epoxy resin, aliphatic polyol glycidyl ether epoxy resin, etc., can be enumerated. In an embodiment, DER331 resin (produced by Dow Chemical) is used as the binder resin.

Furthermore, the solvent in the pigment dispersion can be propylene glycol methyl ether acetate (Molecular formula: $CH_3COOCH(CH_3)CH_2OCH_3$, English name: Propylene glycol monomethyl ether acetate, briefly PMA), ethyl 3-ethoxypropionate (Molecular formula: $C_7H_{14}O_3$, English name: Ethyl 3-Ethoxypropionate, briefly EEP), propylene glycol diacetate, 2-heptanone or cyclohexanone, in which PMA, EEP and propylene glycol diacetate are preferred.

An embodiment of the invention further provides a method for preparing the aforementioned pigment dispersion as shown in FIG. 1 comprising:

S1, adding 1.5%~12% by mass percentage of a dispersant and 0.75%~7.5% by mass percentage of a binder resin into 10%~30% by mass percentage of a solvent, and mixing thoroughly by agitation to form a first mixture;

usually, the agitation speed in S1 can be any stable speed from 1500 to 6000 rotations per minute.

S2, adding 10%~20% by mass percentage of a pigment into the first mixture, and mixing thoroughly by agitation to form a second mixture;

usually, the agitation speed in S2 can be any stable speed from 1500 to 6000 rotations per minute.

S3, diluting the second mixture with 28.5%~77.3% by mass percentage of a solvent;

usually, the agitation speed in S3 can be any stable speed from 300 to 800 rotations per minute, wherein, S1, S2 and S3 can be generally called the pre-dispersion stage.

S4, grinding and dispersing the second mixture after being thoroughly diluted by using a sand mill; after a predetermined interval, 0.45%~2% by mass percentage of a nonionic fluorocarbon surfactant is added into the ground and dispersed second mixture for further grinding and dispersing, thereby obtaining the pigment dispersion.

Usually, before the addition of the nonionic fluorocarbon surfactant, the agitation speed in S4 can be any stable speed from 800 to 4000 rotations per minute; and after the addition of the nonionic fluorocarbon surfactant, the agitation speed in S4 can be any stable speed from 1000 to 4000 rotations per minute.

The predetermined time interval can be any grinding and dispersion time as required, for example, 1-10 hours, preferably 2-8 hours.

S4 can be called grinding and dispersion stage.

In S1-S4 stages, the mass percentage of the added materials is based on the total mass of the finally prepared pigment dispersion, i.e., the finally prepared pigment dispersion is 100 mass %.

An embodiment of the invention further provides another method for preparing the aforementioned pigment dispersion comprising:

S1, adding 1.5%~12% by mass percentage of a dispersant, 0.75%~7.5% by mass percentage of a binder resin and 0.45%~2% by mass percentage of a nonionic fluorocarbon surfactant into 10%~30% by mass percentage of a solvent, and mixing thoroughly by agitation to form a first mixture;

usually, the agitation speed in S1 can be any stable speed from 1500 to 6000 rotations per minute.

S2, adding 10%~20% by mass percentage of a pigment into the first mixture, and mixing thoroughly by agitation to form a second mixture;

usually, the agitation speed in S2 can be any stable speed from 1500 to 6000 rotations per minute.

S3, diluting the second mixture with 28.5%~77.3% by mass percentage of a solvent;

usually, the agitation speed in S3 can be any stable speed from 300 to 800 rotations per minute, wherein S1, S2 and S3 can be generally called the pre-dispersion stage.

S4, grinding and dispersing the second mixture after being thoroughly diluted by using a sand mill, thereby obtaining the pigment dispersion.

usually, before the addition of the nonionic fluorocarbon surfactant, the agitation speed in S4 can be any stable speed from 800 to 4000 rotations per minute.

S4 can be called the grinding and dispersion stage.

In S1 -S4 stages, the mass percentage of the added materials is based on the total mass of the finally prepared pigment dispersion, i.e., the finally prepared pigment dispersion is 100 mass %.

An embodiment of the invention further provides another method for preparing the aforementioned pigment dispersion comprising:

S1, adding 1.5%~12% by mass percentage of a dispersant and 0.75%~7.5% by mass percentage of a binder resin into 10%~30% by mass percentage of a solvent, and mixing thoroughly by agitation to form a first mixture;

usually, the agitation speed in S1 can be any stable speed from 1500 to 6000 rotations per minute.

S2, adding 10%~20% by mass percentage of a pigment into the first mixture, and mixing thoroughly by agitation to form a second mixture;

usually, the agitation speed in S2 can be any stable speed from 1500 to 6000 rotations per minute.

S3, diluting the second mixture with 28.5%~77.3% by mass percentage of a solvent;

usually, the agitation speed in S3 can be any stable speed from 300 to 800 rotations per minute, wherein, S1, S2 and S3 can be generally called the pre-dispersion stage.

S4, grinding and dispersing the second mixture after being thoroughly diluted by using a sand mill to form a third mixture.

usually, the agitation speed in S4 can be any stable speed from 800 to 4000 rotations per minute.

S4 can be called the grinding and dispersion stage.

S5, adding 0.45%~2% by mass percentage of a nonionic fluorocarbon surfactant into the third mixture, thereby obtaining the pigment dispersion;

usually, the agitation speed in S5 can be any stable speed from 800 to 4000 rotations per minute.

S5 can be called the post-discharging stage.

In S1-S5 stages, the mass percentage of the added materials is by the total mass of the finally prepared pigment dispersion, i.e., the finally prepared pigment dispersion is 100 mass %.

Based on the concept of the invention, the nonionic fluorocarbon surfactant can be added in the pre-dispersion stage, grinding and dispersion stage or post-discharging stage, optionally with agitation. Based on need, the nonionic fluorocarbon surfactant can also be added in any two or three of the aforementioned three stages.

In order to illustrate the advantages of the pigment dispersion prepared in the solution of the embodiments of the invention relative to the prior art, first, a pigment dispersion was prepared according to the prior art and the pigment dispersion thus prepared can be investigated.

The specific procedure of the method for preparing the pigment dispersion of the prior art is as follows:

S11, 250 g of BYK2000 (dispersant) and 60 g of a binder resin (DER331) are added into 300 g of PMA, followed by agitation continuously for 30 min at 3000 rotations per minute to form a first mixture;

S12, 180 g of a pigment (G36) is added into the first mixture, followed by agitation continuously for 60 min at 3000 rotations per minute to form a second mixture;

S13, 210 g of PMA is added into the second mixture, followed by agitation continuously for 10 min at 800 rotations per minute to form the thoroughly diluted second mixture;

Similarly, S11, S12 and S13 can be generally called the pre-dispersion stage. S14, the thoroughly diluted second mixture is placed into a sand mill and first ground for 5 min at the speed of 800 rotations per minute and then ground for 120 min at the speed of 2000 rotations per minute.

Similarly, S14 can be called the grinding and dispersion stage.

After the completion of S14, the procedure for preparing the pigment dispersion according to the preparation method in the prior art has been completed.

After the preparation of the pigment dispersion, the change of the particle size and viscosity of the pigment dispersion prepared according to the preparation method in the prior art vs. time has been investigated. Specifically, the change of the particle size and viscosity of the pigment dispersion prepared according to the preparation method in the prior art vs. time at 25° C. and 41° C. has been investigated.

Table 1 shows the change of the particle size and viscosity of the pigment dispersion prepared according to the preparation method in the prior art vs. time at different temperatures.

TABLE 1

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 57.98 | 81.61 | 258.96 | 340.2 | 401.23 | 438.35 | 472.2 |
| Particle size (nm) (41° C.) | 57.35 | 77.45 | 287.3 | 320.48 | 415.89 | 478.21 | 495.32 |
| Viscosity (cps) (25° C.) | 4.53 | 18.82 | flocculation | flocculation | flocculation | flocculation | flocculation |
| Viscosity (cps) (41° C.) | 4.65 | 18.78 | flocculation | flocculation | flocculation | flocculation | flocculation |

From Table 1, it can be seen that when the pigment dispersions prepared according to the preparation method in the prior art were just prepared, their particle sizes were about 58 nm. However, these pigment dispersions were greatly unstable. With the lapse of time, the particle sizes and viscosities of these pigment dispersions increased. Moreover, at Day 3, flocculation occurred to these pigment dispersions, indicating the poor stability of these pigment dispersions.

The technical solutions of the method for preparing the pigment dispersion of the invention are further illustrated by way of multiple examples below.

EXAMPLE 1.1

S101, 250 g of BYK2000 (dispersant) and 60 g of a binder resin (DER331) were added into 200 g of PMA, followed by agitation continuously for 30 min at 3000 rotations per minute to form a first mixture;

As mentioned before, the dispersants of BYK2000 series generally have solid contents of 40%~46%, so the solid content of the 250 g of BYK2000 here was between 100 g~115 g.

S102, 180 g of a pigment (G36) was added into the first mixture, followed by agitation continuously for 60 min at 3000 rotations per minute to form a second mixture;

S103, 290 g of PMA was added into the second mixture, followed by agitation continuously for 10 min at 800 rotations per minute to form the thoroughly diluted second mixture;

Similarly, S101, S102 and S103 can be generally called the pre-dispersion stage.

S104, the thoroughly diluted second mixture was placed into a sand mill and first ground for 5 min at the speed of 800 rotations per minute and then ground at the speed of 2000 rotations per minute. After grinding for 60 minutes, to the second mixture in grinding, 20 g of a nonionic polyoxyethylene ether fluorocarbon surfactant (supplied by Shanghai Intechem Corporation Co. Ltd.) was added. The grinding was continued for 60 minutes to obtain the pigment dispersion.

Similarly, S104 can be called the grinding and dispersion stage.

After the completion of S104, the pigment dispersion of Example 1.1 of the invention has been formed.

After the preparation of the pigment dispersion, the change of the particle size and viscosity of the pigment dispersion vs. time has been investigated. Specifically, the change of the particle size and viscosity of the pigment dispersion vs. time at 25° C. and 41° C. has been investigated.

Table 2a shows the change of the particle size and viscosity of the pigment dispersion of Example 1.1 vs. time at different temperatures.

TABLE 2a

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 58.61 | 59.15 | 58.3 | 61.67 | 58.37 | 59.82 | 62.73 |
| Particle size (nm) (41° C.) | 56.63 | 58.62 | 56.64 | 58.96 | 56.74 | 58.61 | 56.75 |
| Viscosity (cps) (25° C.) | 4.32 | 4.38 | 4.02 | 4.22 | 4.29 | 4.21 | 4.14 |
| Viscosity (cps) (41° C.) | 4.48 | 4.45 | 4.19 | 3.98 | 4.09 | 4.13 | 4.33 |

From Table 2a, it can be seen that after 20 g of a nonionic polyoxyethylene ether fluorocarbon surfactant was added during the grinding and dispersion stage, the change of particle size and viscosity of the pigment dispersion vs. time was very small no matter at 25° C. or 41° C. Compared to the pigment dispersion prepared according to the preparation method in the prior art, the stability of the pigment dispersion prepared in Example 1.1 of the invention has been greatly improved.

For sake of description, the pigment dispersion prepared in Example 1.1 was called the first pigment dispersion.

It should be noted that the 20 g of the nonionic polyoxyethylene ether fluorocarbon surfactant in Example 1.1 can also be added during the pre-dispersion stage. Hereafter, Example 1.2, in which the nonionic polyoxyethylene ether fluorocarbon surfactant was added during the pre-dispersion stage of the preparation of the pigment dispersion, is provided.

EXAMPLE 1.2

S111, 250 g of BYK2000 (dispersant), 60 g of a binder resin (DER331), and 20 g of a nonionic polyoxyethylene ether fluorocarbon surfactant were added into 200 g of PMA, followed by agitation continuously for 30 min at 3000 rotations per minute to form a first comparative mixture;

As mentioned before, the BYK2000 series of dispersants generally have solid contents of 40%~46%, so the solid content of the 250 g of BYK2000 here was between 100 g~115 g.

S112, 180 g of a pigment (G36) was added into the first comparative mixture, followed by agitation continuously for 60 min at 3000 rotations per minute to form a second comparative mixture;

S113, 290 g of PMA was added into the second comparative mixture, followed by agitation continuously for 10 min at 800 rotations per minute to form the thoroughly diluted second comparative mixture;

Similarly, S111, S112 and S113 can be generally called the pre-dispersion stage.

S114, the thoroughly diluted second comparative mixture was placed into a sand mill and first ground for 5 min at the speed of 800 rotations per minute and then ground for 120 min at the speed of 2000 rotations per minute.

Similarly, S114 can be called the grinding and dispersion stage.

After the completion of S114, the first comparative pigment dispersion has been formed.

Similarly, the change of the particle size and viscosity of the first comparative pigment dispersion vs. time at 25° C. and 41° C. has been investigated.

Table 2b shows the change of the particle size and viscosity of the first comparative pigment dispersion prepared by adding a nonionic polyoxyethylene ether fluorocarbon surfactant during the pre-dispersion stage vs. time at different temperatures.

TABLE 2b

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 60.01 | 68.60 | 139.1 | 140.2 | 250 | 258.3 | 261.2 |
| Particle size (nm) (41° C.) | 59.22 | 71.11 | 167.3 | 160.8 | 265.4 | 274.4 | 273.1 |
| Viscosity (cps) (25° C.) | 4.66 | 5.82 | 19.35 | flocculation | flocculation | flocculation | flocculation |
| Viscosity (cps) (41° C.) | 4.78 | 6.78 | 19.85 | flocculation | flocculation | flocculation | flocculation |

From Table 2b, it can be seen that after adding 20 g of the nonionic polyoxyethylene ether fluorocarbon surfactant during the pre-dispersion stage, when the first comparative pigment dispersion was just prepared, the particle size of this first comparative pigment dispersion was small. However, no matter at 25° C. or 41° C., the particle size of the first comparative pigment dispersion was larger than 100 nanometer at Day 3, while at Day 7, flocculation occurred to the first comparative pigment dispersion. Although the stability of the first comparative pigment dispersion was improved compared to the pigment dispersion prepared according to the preparation method in the prior art, it was poorer than that of the first pigment dispersion.

In addition to Example 1.2, an embodiment of the invention further provides Example 1.3 as follows.

EXAMPLE 1.3

S121, 250 g of BYK2000 (dispersant) and 60 g of a binder resin (DER331) were added into 200 g of PMA, followed by agitation continuously for 30 min at 3000 rotations per minute to form a third comparative mixture;

As mentioned before, the dispersants of BYK2000 series generally have solid contents of 40%~46%, so the solid content of the 250 g of BYK2000 here was between 100 g ~115 g.

S122, 180 g of a pigment (G36) was added into the third comparative mixture, followed by agitation continuously for 60 min at 3000 rotations per minute to form a fourth comparative mixture;

S123, 290 g of PMA was added into the fourth comparative mixture, followed by agitation continuously for 10 min at 800 rotations per minute to form the thoroughly diluted fourth comparative mixture;

Similarly, S121, S122 and S123 can be generally called the pre-dispersion stage.

S124, the thoroughly diluted fourth comparative mixture was placed into a sand mill and first ground for 5 min at the speed of 800 rotations per minute and then ground for 120 min at the speed of 2000 rotations per minute to form a fifth comparative mixture.

Similarly, S124 can be called the grinding and dispersion stage.

S125, 20 g of a nonionic polyoxyethylene ether fluorocarbon surfactant was added into the fifth comparative mixture, followed by agitation for 5 min at the speed of 800 rotations per minute.

After the completion of S125, the second comparative pigment dispersion has been formed.

Generally, S125 can be called the post-discharging stage.

Similarly, the change of the particle size and viscosity of the second comparative pigment dispersion vs. time at 25° C. and 41° C. has been investigated.

Table 2c shows the change of the particle size and viscosity of the second comparative pigment dispersion prepared by adding the nonionic polyoxyethylene ether fluorocarbon surfactant during the post-discharging stage vs. time at different temperatures.

TABLE 2c

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 63.45 | 61.22 | 60.01 | 69.36 | 155.2 | 178.69 | 200.11 |
| Particle size (nm) (41° C.) | 63.21 | 60.56 | 60.89 | 68.87 | 123.22 | 168.99 | 199.86 |
| Viscosity (cps) (25° C.) | 4.66 | 4.56 | 4.63 | 5.69 | 18.56 | flocculation | flocculation |
| Viscosity (cps) (41° C.) | 4.69 | 4.63 | 4.65 | 5.33 | 17.69 | flocculation | flocculation |

From Table 2c, it can be seen that after adding 20 g of the nonionic polyoxyethylene ether fluorocarbon surfactant during the post-discharging stage, when the second comparative pigment dispersion was just prepared, the particle size of this second comparative pigment dispersion was small. However, no matter at 25° C. or 41° C., the particle size of the second comparative pigment dispersion was larger than 100 nanometer at Day 30, while at Day 60, flocculation occurred to the second comparative pigment dispersion. Although the stability of the second comparative pigment dispersion was improved compared to the pigment dispersion prepared according to the preparation method in the prior art and the first comparative pigment dispersion, it was poorer than that of the first pigment dispersion.

In sum, although the pigment dispersions prepared in Examples 1.1, 1.2 and 1.3 are all more excellent than that in the prior art, it can be seen from the comparison among Example 1.1, Example 1.2 and Example 1.3 that the preparation method in Example 1.1 is optimal.

The nonionic polyoxyethylene ether fluorocarbon surfactants added in Example 1.1, Example 1.2 and Example 1.3 were 2% by mass percentage. In the method for preparing the pigment dispersion according to the invention, the mass percentage of the nonionic fluorocarbon surfactant is 0.45%~2%. In order to sufficiently illustrate the feasibility of the 0.45%~2% by mass percentage of the nonionic fluorocarbon surfactant added, Examples 2.1-2.3 are provided below.

EXAMPLE 2.1

S201, 40 g of BYK2001 (dispersant) and 8 g of a binder resin (DER331) were added into 150 g of EEP, followed by agitation continuously for 30 min at 3000 rotations per minute to form a first mixture;

As mentioned before, the dispersants of BYK 2000 series generally have solid contents of 40%~46%, so the solid content of the 40 g of BYK2001 here was between 16 g 18.4 g.

S202, 100 g of a pigment (G36) was added into the first mixture, followed by agitation continuously for 60 min at 3000 rotations per minute to form a second mixture;

S203, 697.5 g of EEP was added into the second mixture, followed by agitation continuously for 10 min at 800 rotations per minute to form the thoroughly diluted second mixture;

Similarly, S201, S202 and S203 can be generally called the pre-dispersion stage.

S204, the thoroughly diluted second mixture was placed into a sand mill and first ground for 5 min at the speed of 800 rotations per minute and then ground at the speed of 2000 rotations per minute. After grinding for 60 minutes, to the second mixture in grinding, 4.5 g of a nonionic polyoxyethylene ether fluorocarbon surfactant was added. The grinding was continued for 60 minutes to obtain the pigment dispersion.

Similarly, S204 can be called the grinding and dispersion stage.

After the completion of S204, the pigment dispersion of Example 2.1 of the invention has been formed.

After the preparation of the pigment dispersion, the change of the particle size and viscosity of the pigment dispersion vs. time has been investigated. Specifically, the change of the particle size and viscosity of the pigment dispersion vs. time at 25° C. and 41° C. has been investigated.

Table 3a shows the change of the particle size and viscosity of the pigment dispersion of Example 2.1 vs. time at different temperatures.

TABLE 3a

| | Time (day) | | | | | | |
|---|---|---|---|---|---|---|---|
| | 1 | 2 | 3 | 7 | 30 | 60 | 90 |
| Particle size (nm) (25° C.) | 58.00 | 57.36 | 58.36 | 58.01 | 59.15 | 57.50 | 56.58 |
| Particle size (nm) (41° C.) | 58.04 | 57.77 | 58.22 | 58.09 | 57.59 | 57.49 | 57.81 |
| Viscosity (cps) (25° C.) | 4.30 | 4.46 | 4.33 | 4.27 | 3.98 | 4.05 | 4.26 |
| Viscosity (cps) (41° C.) | 4.45 | 4.19 | 4.22 | 4.28 | 4.10 | 4.24 | 4.49 |

From Table 3a, it can be seen that after 4.5 g of a nonionic polyoxyethylene ether fluorocarbon surfactant was added during the grinding and dispersion stage, the change of particle size and viscosity of the pigment dispersion vs. time was very small no matter at 25° C. or 41° C. Compared to the pigment dispersion prepared according to the preparation method in the prior art, the stability of the pigment dispersion prepared in Example 2.1 of the invention has been greatly improved.

For sake of description, the pigment dispersion prepared in Example 2.1 was called the second pigment dispersion.

It should be noted that the 4.5 g of the nonionic polyoxyethylene ether fluorocarbon surfactant in Example 2.1 can also be added during the pre-dispersion stage. Hereafter, Example 2.2, in which the nonionic polyoxyethylene ether fluorocarbon surfactant was added during the pre-dispersion stage of the preparation of the pigment dispersion, is provided.

EXAMPLE 2.2

S211, 40 g of BYK2001 (dispersant), 8 g of a binder resin (DER331), and 4.5 g of a nonionic polyoxyethylene ether fluorocarbon surfactant were added into 150 g of EEP, followed by agitation continuously for 30 min at 3000 rotations per minute to form a sixth comparative mixture;

As mentioned before, the dispersants of BYK2000 series generally have solid contents of 40%~46%, so the solid content of the 40 g of BYK2001 here was between 16 g ~18.4 g.

S212, 100 g of a pigment (G36) was added into the sixth comparative mixture, followed by agitation continuously for 60 min at 3000 rotations per minute to form a seventh comparative mixture;

S213, 697.5 g of EEP was added into the seventh comparative mixture, followed by agitation continuously for 10 min at 800 rotations per minute to form the thoroughly diluted seventh comparative mixture;

Similarly, S211, S212 and S213 can be generally called the pre-dispersion stage.

S214, the thoroughly diluted seventh comparative mixture was placed into a sand mill and first ground for 5 min at the speed of 800 rotations per minute and then ground for 120 min at the speed of 2000 rotations per minute.

Similarly, S214 can be called the grinding and dispersion stage.

After the completion of S214, the third comparative pigment dispersion has been formed.

Similarly, the change of the particle size and viscosity of the third comparative pigment dispersion vs. time at 25° C. and 41° C. has been investigated.

Table 3b shows the change of the particle size and viscosity of the third comparative pigment dispersion prepared by adding a nonionic polyoxyethylene ether fluorocarbon surfactant during the pre-dispersion stage vs. time at different temperatures.

TABLE 3b

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 59.97 | 67.34 | 78.62 | 80.41 | 116.56 | 208.97 | 220.35 |
| Particle size (nm) (41° C.) | 58.36 | 64.48 | 76.56 | 79.25 | 110.3 | 212.3 | 233.2 |
| Viscosity (cps) (25° C.) | 4.66 | 5.82 | 8.35 | 8.63 | 20.36 | flocculation | flocculation |
| Viscosity (cps) (41° C.) | 4.45 | 4.86 | 7.61 | 8.36 | 18.55 | flocculation | flocculation |

From Table 3b, it can be seen that after adding 4.5 g of the nonionic polyoxyethylene ether fluorocarbon surfactant during the pre-dispersion stage, when the third comparative pigment dispersion was just prepared, the particle size of this third comparative pigment dispersion was small. However, no matter at 25° C. or 41° C., the particle size of the third comparative pigment dispersion was larger than 100 nanometer at Day 30, while at Day 60, flocculation occurred to the third comparative pigment dispersion. Although the stability of the third comparative pigment dispersion was improved compared to the pigment dispersion prepared according to the preparation method in the prior art, it was poorer than that of the second pigment dispersion.

In addition to Example 2.2, Example 2.3 can also be prepared in comparison to Example 2.1 as follows.

EXAMPLE 2.3

S221, 40 g of BYK2001 (dispersant) and 8 g of a binder resin (DER331) were added into 150 g of EEP, followed by agitation continuously for 30 min at 3000 rotations per minute to form an eighth comparative mixture;

As mentioned before, the dispersants of BYK 2000 series generally have solid contents of 40%~46%, so the solid content of the 40 g of BYK2001 here was between 16 g~18.4 g.

S222, 100 g of a pigment (G36) was added into the eighth comparative mixture, followed by agitation continuously for 60 min at 3000 rotations per minute to form a ninth comparative mixture;

S223, 697.5 g of EEP was added into the ninth comparative mixture, followed by agitation continuously for 10 min at 800 rotations per minute to form the thoroughly diluted ninth comparative mixture;

Similarly, S221, S222 and S223 can be generally called the pre-dispersion stage.

S224, the thoroughly diluted ninth comparative mixture was placed into a sand mill and first ground for 5 min at the speed of 800 rotations per minute and then ground for 120 min at the speed of 2000 rotations per minute to form a tenth comparative mixture.

Similarly, S224 can be called the grinding and dispersion stage.

S225, 4.5 g of a nonionic polyoxyethylene ether fluorocarbon surfactant was added into the tenth comparative mixture, followed by agitation for 5 min at the speed of 800 rotations per minute.

After the completion of S225, the fourth comparative pigment dispersion has been formed.

Generally, S225 can be called the post-discharging stage.

Similarly, the change of the particle size and viscosity of the fourth comparative pigment dispersion vs. time at 25° C. and 41° C. has been investigated.

Table 3c shows the change of the particle size and viscosity of the fourth comparative pigment dispersion prepared by adding the nonionic polyoxyethylene ether fluorocarbon surfactant during the post-discharging stage vs. time at different temperatures.

TABLE 3c

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 57.59 | 57.87 | 59.99 | 56.65 | 147.4 | 152.62 | 288.92 |
| Particle size (nm) (41° C.) | 58.29 | 59.75 | 58.40 | 57.87 | 142.41 | 144.6 | 267.25 |
| Viscosity (cps) (25° C.) | 4.25 | 4.29 | 4.44 | 4.51 | 20.33 | flocculation | flocculation |
| Viscosity (cps) (41° C.) | 4.28 | 4.27 | 4.48 | 4.56 | 17.58 | flocculation | flocculation |

From Table 3c, it can be seen that after adding 4.5 g of the nonionic polyoxyethylene ether fluorocarbon surfactant during the post-discharging stage, when the fourth comparative pigment dispersion was just prepared, the particle size of this fourth comparative pigment dispersion was small. However, no matter at 25° C. or 41° C., the particle size of the fourth comparative pigment dispersion was larger than 100 nanometer at Day 30, while at Day 60, flocculation occurred to the fourth comparative pigment dispersion. Although the stability of the fourth comparative pigment dispersion was improved compared to the pigment dispersion prepared according to the preparation method in the prior art and the third comparative pigment dispersion, it was poorer than that of the second pigment dispersion.

In sum, although the pigment dispersions prepared in Examples 2.1, 2.2 and 2.3 are all more excellent than that in the prior art, it can be seen from the comparison among Example 2.1, Example 2.2 and Example 2.3 that the preparation method in Example 2.1 is optimal.

The nonionic polyoxyethylene ether fluorocarbon surfactants added in Example 2.1, Example 2.2 and Example 2.3 were 0.45% by mass percentage.

In order to sufficiently illustrate the feasibility of the 0.45%~2% by mass percentage of the nonionic fluorocarbon surfactant added. Examples 3.1-3.3 are further provided below.

EXAMPLE 3.1

S301, 175 g of BYK2001 (dispersant) and 40 g of a binder resin (DER331) were added into 100 g of propylene glycol diacetate, followed by agitation continuously for 30 min at 3000 rotations per minute to form a first mixture;

As mentioned before, the dispersants of BYK2000 series generally have solid contents of 40%~46%, so the solid content of the 175 g of BYK2001 here was between 70 g ~80.5 g.

S302, 150 g of a pigment (G36) was added into the first mixture, followed by agitation continuously for 60 min at 3000 rotations per minute to form a second mixture;

S303, 525 g of propylene glycol diacetate was added into the second mixture, followed by agitation continuously for 10 min at 800 rotations per minute to form the thoroughly diluted second mixture;

Similarly, S301, S302 and S303 can be generally called the pre-dispersion stage.

S304, the thoroughly diluted second mixture was placed into a sand mill and first ground for 5 min at the speed of 800 rotations per minute and then ground at the speed of 2000 rotations per minute. After grinding for 60 minutes, to the second mixture in grinding, 10 g of a nonionic polyoxyethylene ether fluorocarbon surfactant was added. The grinding was continued for 60 minutes to obtain the pigment dispersion.

Similarly, S304 can be called the grinding and dispersion stage.

After the completion of S304, the pigment dispersion of Example 3.1 of the invention has been formed.

After the preparation of the pigment dispersion, the change of the particle size and viscosity of the pigment dispersion vs. time has been investigated. Specifically, the change of the particle size and viscosity of the pigment dispersion vs. time at 25° C. and 41° C. has been investigated.

Table 4a shows the change of the particle size and viscosity of the pigment dispersion of Example 3.1 vs. time at different temperatures.

TABLE 4a

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 57.81 | 57.26 | 56.79 | 56.47 | 57.47 | 58.79 | 59.85 |
| Particle size (nm) (41° C.) | 57.24 | 58.27 | 56.34 | 57.31 | 56.13 | 57.06 | 57.21 |
| Viscosity (cps) (25° C.) | 4.49 | 4.44 | 4.50 | 4.26 | 4.47 | 4.61 | 4.39 |
| Viscosity (cps) (41° C.) | 4.31 | 4.40 | 4.34 | 4.49 | 4.28 | 4.38 | 4.31 |

From Table 4a, it can be seen that after 10 g of a nonionic polyoxyethylene ether fluorocarbon surfactant was added during the grinding and dispersion stage, the change of particle size and viscosity of the pigment dispersion vs. time was very small no matter at 25° C. or 41° C. Compared to the pigment dispersion prepared according to the preparation method in the prior art, the stability of the pigment dispersion prepared in Example 3.1 of the invention has been greatly improved.

For sake of description, the pigment dispersion prepared in Example 3.1 was called the third pigment dispersion.

It should be noted that the 10 g of the nonionic polyoxyethylene ether fluorocarbon surfactant in Example 3.1 can also be added during the pre-dispersion stage. Hereafter, Example 3.2, in which the nonionic polyoxyethylene ether fluorocarbon surfactant was added during the pre-dispersion stage of the preparation of the pigment dispersion, is provided.

EXAMPLE 3.2

S311, 175 g of BYK21116 (dispersant), 40 g of a binder resin (DER331), and 10 g of a nonionic polyoxyethylene ether fluorocarbon surfactant were added into 100 g of propylene glycol diacetate, followed by agitation continuously for 30 min at 3000 rotations per minute to form an eleventh comparative mixture;

As mentioned before, the dispersants of BYK2000 series generally have solid contents of 40%~46%, so the solid content of the 175 g of BYK21116 here was between 70 g~80.5 g.

S312, 150 g of a pigment (G36) was added into the eleventh comparative mixture, followed by agitation continuously for 60 min at 3000 rotations per minute to form a twelfth comparative mixture;

S313, 525 g of propylene glycol diacetate was added into the twelfth comparative mixture, followed by agitation continuously for 10 min at 800 rotations per minute to form the thoroughly diluted twelfth comparative mixture;

Similarly, S311, S312 and S313 can be generally called the pre-dispersion stage.

S314, the thoroughly diluted twelfth mixture was placed into a sand mill and first ground for 5 min at the speed of 800 rotations per minute and then ground for 120 min at the speed of 2000 rotations per minute.

Similarly, S314 can be called the grinding and dispersion stage.

After the completion of S314, the fifth comparative pigment dispersion has been formed.

Similarly, the change of the particle size and viscosity of the fifth comparative pigment dispersion vs. time at 25° C. and 41° C. has been investigated.

Table 4b shows the change of the particle size and viscosity of the fifth comparative pigment dispersion prepared by adding a nonionic polyoxyethylene ether fluorocarbon surfactant during the pre-dispersion stage vs. time at different temperatures.

TABLE 4b

|  | Time (day) | | | | | | |
| --- | --- | --- | --- | --- | --- | --- | --- |
|  | 1 | 2 | 3 | 7 | 30 | 60 | 90 |
| Particle size (nm) (25° C.) | 57.13 | 62.32 | 74.52 | 98.25 | 98.57 | 118.10 | 177.58 |
| Particle size (nm) (41° C.) | 57.35 | 66.56 | 74.61 | 96.43 | 95.88 | 117.35 | 156.36 |
| Viscosity (cps) (25° C.) | 4.52 | 5.82 | 7.35 | 8.63 | 18.42 | flocculation | flocculation |
| Viscosity (cps) (41° C.) | 4.55 | 5.86 | 7.67 | 8.53 | 21.68 | flocculation | flocculation |

From Table 4b, it can be seen that after adding 10 g of the nonionic polyoxyethylene ether fluorocarbon surfactant during the pre-dispersion stage, when the fifth comparative pigment dispersion was just prepared, the particle size of this fifth comparative pigment dispersion was small. However, no matter at 25° C. or 41° C., the particle size of the fifth comparative pigment dispersion was larger than 100 nanometer at Day 60, while at Day 60, flocculation occurred to the fifth comparative pigment dispersion. Although the stability of the fifth comparative pigment dispersion was improved compared to the pigment dispersion prepared according to the preparation method in the prior art, it was poorer than that of the third pigment dispersion.

In addition to Example 3.2, Example 3.3 can also be prepared in comparison to Example 3.1 as follows.

EXAMPLE 3.3

S321, 175 g of BYK21116 (dispersant) and 40 g of a binder resin (DER331) were added into 100 g of propylene glycol diacetate, followed by agitation continuously for 30 min at 3000 rotations per minute to form a thirteenth comparative mixture;

As mentioned before, the dispersants of BYK 2000 series generally have solid contents of 40%~46%, so the solid content of the 175 g of BYK21116 here was between 70 g~80.5 g.

S322, 150 g of a pigment (G36) was added into the thirteenth comparative mixture, followed by agitation continuously for 60 min at 3000 rotations per minute to form a fourteenth comparative mixture;

S323, 525 g of propylene glycol diacetate was added into the fourteenth comparative mixture, followed by agitation continuously for 10 min at 800 rotations per minute to form the thoroughly diluted fourteenth comparative mixture;

Similarly, S321, S322 and S323 can be generally called the pre-dispersion stage.

S324, the thoroughly diluted fourteenth comparative mixture was placed into a sand mill and first ground for 5 min at the speed of 800 rotations per minute and then ground for 120 min at the speed of 2000 rotations per minute to form a fifteenth comparative mixture.

Similarly, S324 can be called the grinding and dispersion stage.

S325, 10 g of a nonionic polyoxyethylene ether fluorocarbon surfactant was added into the fifteenth comparative mixture, followed by agitation for 5 min at the speed of 800 rotations per minute.

After the completion of S325, the sixth comparative pigment dispersion has been formed.

Generally, S325 can be called the post-discharging stage.

Similarly, the change of the particle size and viscosity of the sixth comparative pigment dispersion vs. time at 25° C. and 41° C. has been investigated.

Table 4c shows the change of the particle size and viscosity of the sixth comparative pigment dispersion prepared by adding the nonionic polyoxyethylene ether fluorocarbon surfactant during the post-discharging stage vs. time at different temperatures.

TABLE 4c

| | Time (day) | | | | | | |
|---|---|---|---|---|---|---|---|
| | 1 | 2 | 3 | 7 | 30 | 60 | 90 |
| Particle Size (nm) (25° C.) | 56.71 | 57.90 | 59.77 | 56.37 | 96.81 | 119.88 | 178.45 |
| Particle Size (nm) (41° C.) | 56.86 | 57.57 | 58.34 | 57.92 | 97.52 | 118.32 | 188.00 |
| Viscosity (cps) (25° C.) | 4.25 | 4.29 | 4.44 | 4.51 | 17.33 | flocculation | flocculation |
| Viscosity (cps) (41° C.) | 4.28 | 4.27 | 4.48 | 4.56 | 16.22 | flocculation | flocculation |

From Table 4c, it can be seen that after adding 10 g of the nonionic polyoxyethylene ether fluorocarbon surfactant during the post-discharging stage, when the sixth comparative pigment dispersion was just prepared, the particle size of this sixth comparative pigment dispersion was small. However, no matter at 25'C or 41° C., the particle size of the fourth comparative pigment dispersion was larger than 100 nanometer at Day 60, while at Day 60, flocculation occurred to the sixth comparative pigment dispersion. Although the stability of the sixth comparative pigment dispersion was improved compared to the pigment dispersion prepared according to the preparation method in the prior art and the fifth comparative pigment dispersion, it was poorer than that of the third pigment dispersion.

In sum, although the pigment dispersions prepared in Examples 3.1, 3.2 and 3.3 are all more excellent than that in the prior art, it can be seen from the comparison among Example 3.1, Example 3.2 and Example 3.3 that the preparation method in Example 3.1 is optimal.

It should be noted that the nonionic polyoxyethylene ether fluorocarbon surfactants added in Example 3.1, Example 3.2 and Example 3.3 were 0.1% by mass percentage.

So far, the feasibility of the method for preparing the pigment dispersion provided in the invention, in which 0.45%~2% by mass percentage of a nonionic fluorocarbon surfactant is added, has been sufficiently illustrated.

It should be noted that the solvent in Examples 1.1-1.3 can also be EEP, propylene glycol diacetate, 2-heptanone or cyclohexanone; the solvent in Examples 2.1-2.3 can also be PMA, propylene glycol diacetate, 2-heptanone or cyclohexanone; and the solvent in Examples 11-3.3 can also be PMA, EEP, 2-heptanone or cyclohexanone.

In the technical solutions of the embodiments of the invention, a pigment dispersion is provided, which has a small particle size, low viscosity and good stability which increases the evenness of the surface of the colored film of the colored filter, facilitates the even distribution of the colored film on the colored filter, and effectively reducing the possibility of the deficiencies such as the light leak of the colored filter, etc.

In the technical solutions of the embodiments of the invention, the method for preparing the aforementioned pigment dispersion is further provided. This method is improvement to the methods for preparing the pigment dispersion in the prior art, and makes the obtained pigment dispersion have small particle size, low viscosity and good stability. Moreover, this method has simple operation, low cost and is easy to popularize and use.

The aforementioned are merely exemplary embodiments of the invention, rather than limiting the scope of the invention which is determined by the attached claims.

The invention claimed is:

1. A pigment dispersion comprising the following components in the following mass percentage: 10%-20% pigment, 1.5%-12% dispersant, 0.75%-7.5% binder resin, 58.5%-87.3% solvent and 0.45%-2% nonionic fluorocarbon surfactant, based on the total mass of the pigment dispersion,
wherein
the pigment dispersion is prepared by a method comprising the following steps:
S1, adding the dispersant and the binder resin into 10%-30% by mass percentage of the solvent, and mixing thoroughly by agitation to form a first mixture;
S2, adding the pigment into the first mixture, mixing thoroughly by agitation to form a second mixture;
S3, diluting the second mixture with 28.5%-77.3% by mass percentage of the solvent; and
S4, grinding and dispersing the second mixture after being thoroughly diluted by using a sand mill; after a predetermined interval, adding the nonionic fluorocarbon surfactant into the ground and dispersed second mixture for further grinding and dispersing, thereby obtaining the pigment dispersion,
wherein the mass percentage is based on the total mass of the pigment dispersion,
wherein the dispersant is a block copolymer, and
wherein the binder resin is an epoxy resin.

2. The pigment dispersion according to claim 1, wherein the pigment is a phthalocyanine pigment.

3. The pigment dispersion according to claim 1, wherein the nonionic fluorocarbon surfactant is selected from the group consisting of nonionic polyoxyethylene ether fluorocarbon surfactants, fluorocarbon surfactants containing fluoroalkyl ethoxy ether alcohol, fluorocarbon surfactants having polyoxyethylene moieties, fluorocarbon surfactants containing fluoroalkyl ether alcohol, fluorocarbon surfactants having the polyoxyethylene alcohol of perfluoroalkyl thioether, fluorocarbon surfactants having perfluorocarboxamide polyoxyethylene ether alcohol, and fluorocarbon surfactants containing fluoroalkyl sulfamido alcohol.

4. The pigment dispersion according to claim 3, wherein the nonionic fluorocarbon surfactant is a nonionic polyoxyethylene ether fluorocarbon surfactant.

5. The pigment dispersion according to claim 1, wherein the solvent is propylene glycol methyl ether acetate (PMA), ethyl 3-ethoxypropionate (EEP), propylene glycol diacetate, 2-heptanone or cyclohexanone.

6. A method for preparing the pigment dispersion according to claim 1 comprising the following steps:
S1, adding 1.5%-12% by mass percentage of a dispersant and 0.75%-7.5% by mass percentage of a binder resin into 10%-30% by mass percentage of a solvent, and mixing thoroughly by agitation to form a first mixture;
S2, adding 10%-20% by mass percentage of a pigment into the first mixture, mixing thoroughly by agitation to form a second mixture;
S3, diluting the second mixture with 28.5%-77.3% by mass percentage of a solvent; and
S4, grinding and dispersing the second mixture after being thoroughly diluted by using a sand mill; after a predetermined interval, adding 0.45%-2% by mass percentage of a nonionic fluorocarbon surfactant into the ground and dispersed second mixture for further grinding and dispersing, thereby obtaining the pigment dispersion,
wherein the mass percentage is based on the total mass of the pigment dispersion,
wherein the dispersant is a block copolymer, and
wherein the binder resin is an epoxy resin.

7. The method according to claim 6, wherein the block copolymer is selected from the group consisting of a block copolymer having pigment affinity groups and acrylate block copolymer.

8. The pigment dispersion according to claim 1, wherein the solvent is propylene glycol diacetate, 2-heptanone or cyclohexanone.

9. The pigment dispersion according to claim 1, wherein the block copolymer is selected from the group consisting of a block copolymer having pigment affinity groups and acrylate block copolymer.

* * * * *